(12) United States Patent
Hevia Angulo et al.

(10) Patent No.: US 10,735,188 B2
(45) Date of Patent: Aug. 4, 2020

(54) SYSTEM AND METHOD FOR SECURE ELECTRONIC COMMUNICATIONS THROUGH SECURITY HARDWARE BASED ON THRESHOLD CRYPTOGRAPHY

(71) Applicant: UNIVERSIDAD DE CHILE, Santiago (CL)

(72) Inventors: Alejandro Hevia Angulo, Santiago (CL); Javier Alejandro Bustos Jimenez, Santiago (CL); Francisco Jose Cifuentes Quijada, Santiago (CL)

(73) Assignee: UNIVERSIDAD DE CHILE, Santiago (CL)

( * ) Notice: Subject to any disclaimer, the term of this patent is extended or adjusted under 35 U.S.C. 154(b) by 229 days.

(21) Appl. No.: 16/067,307

(22) PCT Filed: Dec. 30, 2016

(86) PCT No.: PCT/IB2016/058122
§ 371 (c)(1),
(2) Date: Jun. 29, 2018

(87) PCT Pub. No.: WO2017/115338
PCT Pub. Date: Jul. 6, 2017

(65) Prior Publication Data
US 2018/0302217 A1 Oct. 18, 2018

(30) Foreign Application Priority Data

Dec. 30, 2015 (CL) .................................. 201503766

(51) Int. Cl.
*H04L 9/08* (2006.01)
*H04L 29/06* (2006.01)
*H04L 9/32* (2006.01)

(52) U.S. Cl.
CPC ............ *H04L 9/085* (2013.01); *H04L 9/0877* (2013.01); *H04L 9/3249* (2013.01);
(Continued)

(58) Field of Classification Search
CPC ... H04L 9/085; H04L 9/0877; H04L 63/0428; H04L 9/3255; H04L 9/3249; H04L 63/0442
See application file for complete search history.

(56) References Cited

U.S. PATENT DOCUMENTS 7,386,131 B2   6/2008   Jing et al.
8,364,967 B2   1/2013   Sudia et al.
(Continued)

OTHER PUBLICATIONS

V. Shoup; Practical threshold signatures; Proceedings of the International Conference on the Theory and Application of Cryptographic Techniques; Eurocrypt 2000; pp. 207-220.
(Continued)

*Primary Examiner* — Christopher A Revak
(74) *Attorney, Agent, or Firm* — Lucas & Mercanti, LLP

(57) ABSTRACT

The present application is directed to a method and system for secure electronic communications using physically distributed security hardware and capable of operating by simulating a common or unitary HSM device. This is achieved by implementing the internal operations of the HSM using threshold cryptography on a set of internal nodes. In order to provide the necessary functionality, the keys and the required operations (such as the digital signature) are distributed among these nodes. In particular, the system provides digital signature capabilities through an efficient and modular application of Victor Shoup's schema referred to in the background. The digital signature process involves the steps of: 1) the signing agent receives a document to be signed and the alias of the key with which the document will be signed; 2) the signing agent place the
(Continued)

document in the request queue; 3) the active nodes retrieve the request from the queue; 4) each node signs the request with its piece of key; 5) each node puts its partial signature in the response queue; 6) the signing agent receives the partial signatures and verifies them; 7) if at least $k>n/2$ valid partial signatures are received, the signature is validated and delivered to the client. Otherwise, an error message is generated.

12 Claims, 5 Drawing Sheets

(52) U.S. Cl.
CPC ........ *H04L 9/3255* (2013.01); *H04L 63/0428* (2013.01); *H04L 63/0442* (2013.01)

(56) References Cited

U.S. PATENT DOCUMENTS

| | | | | |
|---|---|---|---|---|
| 2004/0039925 | A1* | 2/2004 | McMillan | H04L 63/06 713/189 |
| 2005/0258234 | A1* | 11/2005 | Silverbrook | G06Q 10/087 235/379 |
| 2007/0202945 | A1* | 8/2007 | Stopford | A63F 1/00 463/29 |
| 2009/0198997 | A1* | 8/2009 | Yeap | H04L 63/0823 713/155 |
| 2011/0154045 | A1* | 6/2011 | Lee | H04L 9/3073 713/176 |
| 2013/0223626 | A1* | 8/2013 | Edge | H04W 4/06 380/270 |
| 2015/0349961 | A1* | 12/2015 | Mosko | H04L 9/3239 713/189 |
| 2016/0149708 | A1* | 5/2016 | Garcia Morchon | H04L 9/3093 713/176 |
| 2019/0087432 | A1* | 3/2019 | Sion | G06F 21/62 |
| 2019/0268149 | A1* | 8/2019 | Kariv | H04L 9/0897 |
| 2019/0318078 | A1* | 10/2019 | Liu | H04L 9/0625 |
| 2019/0377889 | A1* | 12/2019 | Mertens | G06F 21/6209 |
| 2020/0092107 | A1* | 3/2020 | Cole | H04L 9/3073 |

OTHER PUBLICATIONS

International Search Report dated Apr. 25, 2017 for PCT/162016/058122.

* cited by examiner

SYSTEM AND METHOD FOR SECURE ELECTRONIC COMMUNICATIONS THROUGH SECURITY HARDWARE BASED ON THRESHOLD CRYPTOGRAPHY

CROSS REFERENCE TO RELATED APPLICATION

This Application is a 371 of PCT/IB2016/058122 filed on Dec. 30, 2016, which claims priority of Chilean Application No. 201503766 filed Dec. 30, 2015, both of which are incorporated herein by reference.

The current technology aims to enable users of computers or electronic devices with communication capabilities to perform cryptographic operations using security hardware. In particular, the present invention relates to a system and method for secure electronic communications using security hardware addressed to a user using asymmetric keys through an electronic communications network.

STATE OF ART

The following glossary is provided to facilitate the revision of some terms and abbreviations used in the disclosure of the present application, they do not correspond to the claimed matter as they are known in the technical area.

AMPQ: The AMQP (Advanced Message Queuing Protocol) standard is an open standard protocol in the application layer of a communication system. The characteristics that define the AMQP protocol are message orientation, queuing, routing (both point-to-point and publish-subscribe), accuracy and security.

API: The application programming interface is the set of subroutines, functions and procedures (or methods, in object-oriented programming) that offers a certain library to be used by other software as a abstraction layer.

Asymmetric keys: pair of keys (PK, SK) assigned to a user, of which one is public knowledge and the other, the private key, must be kept in strict reserve.

DNS: Domain Name System, in this system, a DNS server or determiner is in charge of storing and supplying IP addresses in response to DNS requests.

DNSSEC: the Domain Name System Security Extension is the current extension of the DNS system to provide security limitations to the request process.

Complete signature: signature generated by the combination of a certain number of partial signatures and that can be validated using the corresponding public key to prove, among others, identity.

Partial signature: signature that can be verified individually with respect to the public key, but that cannot generate a complete signature.

HSM: hardware Security Module, these are cryptographic devices that are provided in the form of peripheral devices for a computer or as unit hardware itself with network connectivity.

PK: public key.

PKI: Public Key Infrastructure, it is a system that involves software, hardware, policies and security procedures defined to provide security in operations in which cryptography is applied.

RPC: Remote Procedure Call, it is a network protocol that allows a computer program to execute code in another remote machine without having to worry about the communications between both.

RSA: is a public key cryptographic system developed in 1977 (Rivest, Shamir and Adleman). It is the first and most widely used algorithm of this type and is valid both for encrypting and for digitally signing (RSA signature).

SK: private or secret key.

$SK_i$: i-th key piece.

TCP: Transmission Control Protocol, one of the fundamental protocols on the Internet.

Key piece: key that is associated or paired with a public key, whose signature can be validated with respect to the public key, but cannot generate a complete signature.

VPN: a Virtual Private Network is a network technology that allows a secure extension of the local network (LAN) over a public or uncontrolled network such as the Internet. It allows the computer in the network to send and receive data over shared or public networks as if it were a private network with all the functionality, security and management policies of a private network. This is made establishing a point-to-point virtual connection through the use of dedicated connections, encryption or the combination of both methods.

ZeroMQ: It is a publicly available messaging platform that is able to treat the brokers of AMQP as nodes of a distributed messaging network. It has links to its underlying implementation in C, as well as to other languages such as Python, C++, Lisp, Ruby and others.

Returning on the revision of the state of the art, currently the massiveness in the use of computer tools for communication, identity authentication and the occurring of online transactions among others, contrasts with the low levels of security currently exhibited by the systems that lend them support. It is common for users of computers, smart phones or others to access the Internet to visit different websites without having the awareness of the risks of falsification of the communications to which they are exposed. Given this situation, cryptography as a technique classically dedicated to encryption and coding, has been evolving to provide means to protect information and communications in the field of informatics.

A typical case of exposure to Internet fraud occurs in the addressing process of a user requesting a connection to a resource by its Internet address or URL. In this process, a DNS server is responsible for providing the IP address corresponding to that Internet address or URL. However, in this process, an entity can impersonate the DNS and direct the user to an arbitrary IP in which a second fraud can occur, for example, to obtain personal or business confidential information. Among the vulnerabilities of this case, it is found that the user's system does not verify the identity of who provides the IP to which it is addressed; further, once a response is received with an IP, no other data is expected, which in this case would be contradictory. Then, in a fast action of the entity that impersonates the DNS, an IP is provided to the user before the DNS server does it, the user does not notice at the moment, nor even after the correct information arrives from the DNS.

With the implementation of DNSSEC, it offers a higher level of security for communications such as the one described above. For that, the DNSSEC delivers signed IPs, which the user can verify the source of the IP address that is provided and safely access to it. The process of signing the data corresponding to the IP, exemplifies a secure authenticated communication between the user and a DNSSEC.

A request sent to a DNS determiner is solved from the root of the hierarchy by advancing downwards through the delegation system in which several servers participate throughout the world. However, the introduction of DNSSEC impacts several areas of the operation of an Authoritative DNS server. In particular, the key management procedure can lead to great complexity, both for: (i) dynamic zones (such as top-level domains) or (ii) static zones.

Currently, the performance of secure operations through the Internet can be framed in systems such as the Public Key Infrastructure (PKI). One of the biggest challenges to security in this context is maintaining the confidential nature of the private key, and it is in this challenge that the solution offered by the present invention is framed.

The state of the art in terms of the protection of confidential data such as keys or user certificates includes HSMs. Physically, these are devices that incorporate elements for processing and storage of data, integrated in a structure designed to prevent or hinder, and make evident the non-permitted access to the contained data. Among the functions of the HSM are the generation, storage and protection of cryptographic keys, some models also allow accelerate cryptographic operations via hardware. The use of the HSMs essentially seeks to offer an additional barrier to maintain the confidentiality of the user's data, since the stored private keys are not disseminated outside the HSM device, with the exception of, for example, for backup or transfer of its private key, the user use an accessory that provides security, as is the case of a cryptographic card (a "smart card".)

In a variant to the common HSMs, one can consider the services that HSM online or in the "cloud" most recently offers. Since, the operations carried out with the HSMs in the cloud give access to one of these physical devices through the Internet, with the consequent reduction in the cost of accessing the technology. The solution in this case will not lead to the desired increase in security if the DNS through which the service is accessed does not operate according to DNSSEC.

Another antecedent is the threshold cryptography technology for systems operating with distributed signatures. Cryptographic threshold systems have been widely used in network protocols. Given their distributed nature they have been widely used in security for wireless technology, mobile networks, in voting systems, and as a solution for storing online DNS zone secrets without leaks to a corrupt server. On the other hand, in state-of-the-art systems that operate in a distributed manner, the increase in security entails difficulties in terms of the coordination of communications between multiple components and multiple users.

The general approach adopted to carry out the operation is described below using signature threshold cryptography.

A threshold signature scheme of k over n is a protocol that allows any subset of k participants between n to generate a signature, but does not allow the creation of a valid signature if less than k participants are involved in the protocol.

In this scheme, the secret key is divided into n pieces of key and each piece of key is used to sign the document. The signature generated with the piece of key is called a partial signature. Each partial signature can be verified individually. The signature of the document is produced in a process of combining at least k partial signatures.

In the standard public key schemes, there is a pair of keys (PK; SK), but in a threshold cryptography scheme the pair is defined as a public key and the set of key pieces: $TC=(PK, SK_1, SK_2, \ldots, SK_n)$.

The signature is verified by the public key PK associated with the $SK_i$ key pieces. Therefore, this process is completely transparent to the end users; end users need to know the public key and the signature in order to validate a signed document or message.

The protocol described by Victor Shoup ("Practical Threshold Signatures", in "Advances in Cryptology-Eurocrypt 2000", pages 207-220, spring year 2000) is an important precedent for the realization of the present application. Among the advantages observed is that: (1) it is unforgeable and robust in the random predictive model, (2) the verification of partial signatures is not interactive, nor does it require synchronized communications in the network, (3) the size of the partial signatures is limited by a constant number of times the size of the RSA modules. In the document, it is describes the operation by L participants, a reliable distributor node, and an adversary. Regarding the described parameters: t is the number of corrupt participants and k the number of signature pieces needed to obtain a complete RSA signature. Therefore, a safety margin of k−t participants is taught to violate their safety before the adversary is in a position to fraudulently sign a document. Algorithms are taught for: verification of signature, verification of piece of key, combination of pieces among others.

In relation to the state of the art documents, it is possible to mention document US2006/0023887 that proposes applications for wireless networks related to management and authentication with keys distributed through identity and threshold based cryptography. The main difference of the cited document is that the threshold cryptography is used to generate signatures in a variable set of nodes where the dynamic aspect of the set is paramount. Further, there is no unified interface that is independent of the number of nodes for the user. Furthermore, the mechanism used is different, threshold based on identity, and is aimed at ensuring that nodes can be trusted. Therefore, it is restricted only to the nodes involved and is not directed to any document or message and its signature.

In another example, US2009/0316910 refers to a device and method for handling multiple-node cryptographic keys. However, although keys are stored in a distributed manner, this is done in a conventional manner, storing several common keys in several nodes. That is, only an improvement in the administration of common keys distributed among several nodes is aimed, there is no outstanding effect on the security.

The document U.S. Pat. No. 4,864,615 is related to the reproduction of secure keys, using data distributed for generation. However, the main disadvantage of the methodology is that the operation of the nodes is carried out serially. That is, there is an order and therefore a dependency to which the generation of keys is restricted.

The system disclosed below seeks to increase the security of the management of secret keys in a substantially way, through a different distribution of the keys between the nodes, and that is aimed at the signature of any message or document with total independence in between the signing nodes.

Together with the above, a system is proposed that allows greater compatibility than the platforms for commercially available secure communications currently available, which provide systems with distributed keys that are linked to broad software and applications packages. In those platforms or systems, the use of security improvements is not allowed through typical user applications, such as messaging services that are provided together with or in association with the most widely used operating systems.

With respect to typical HSM devices, either as peripheral devices or with network access, it is seek to improve them in terms of security and economic terms. This last point is possible because by not requiring the incorporation of expensive mechanisms or physical means of prevention of access to data or to establish evidence of security breaches.

As an necessary aspect to implement this system, an initiation procedure is included, aimed at the generation and distribution of the key pieces (SK1, ..., SKn) between the n nodes. This procedure is performed with the connection of the nodes and a main node (40) forming a wired intranet, defined exclusively for these purposes and without connection to any communications network or external, such as Internet.

The initiation procedure is conducted by the main node (40) and includes the steps of:

a) generating and storing an asymmetric key pair, a public key (PK) and a private key (SK), b) generating and storing a set of n pieces of key (SK1, ..., SKn) from the pair of asymmetric keys (PK, SK) according to a threshold cryptography scheme of V. Shoup of k over n, with n the number of pieces, and k the threshold;

c) distribute the pieces of key in a one-to-one relationship of n pieces (SK1, ..., SKn) with n nodes (N1, ..., Nn), so that each node receives exclusively one of the n pieces of key to store it; and d) removing the pieces of key distributed to the other nodes and the private key (SK), generated and stored in step a), from the main node (40).

Note that said main node (40) can be any of the nodes (N1, ..., Nn) or another device arranged specifically for this purpose, in which case any key stored in the main node will be eliminated at the end of the process.

The initiation procedure will be carried out on a few occasions, certainly, prior to putting in operation of the system, but also after the detection or suspected breach of the security of a critical number of nodes t defined less strict than the threshold amount k.

GENERAL DESCRIPTION

This application is directed to a method and system for secure electronic communications using physically distributed security hardware and capable of operating simulating a common or unitary HSM device. This is achieved by implementing the internal operations of the HSM using the threshold cryptography on a set of internal nodes. In order to provide the necessary functionality, the keys and the required operations (such as the digital signature) are distributed among these nodes. In particular, the system provides digital signature capabilities through an efficient and modular application of Victor Shoup's schema referred to before in the background.

The digital signature process involves 7 steps:

1. The signing agent receives a document to sign and the alias of the key with which the document will be signed.

2. The signing agent puts the document in the queue of requests.

3. The active nodes get the request from the queue.

4. Each node signs the request with its piece of key.

5. Each node puts its partial signature in the response queue.

6. The signing agent receives the partial signatures and verifies them.

7. If at least k>n/2 valid partial signatures are received, the signature is validated and delivered to the client. Otherwise, an error message is generated.

Wherein the alias is a reference to be able to use the secret key, for which the alias is associated with a public key.

Note that for a client application of the system, the interaction is made simply with the signing agent, ignoring the existence of the nodes due to the use of a standard access to cryptographic devices since the nodes communicate with the signing agent.

In another essential aspect of the system each node has individuality, it is unique or differs from the others, in terms of its hardware and software infrastructure, and each node is exclusively dedicated to the user's device.

The proposed system discloses a way to separate the operation of DNSSEC from the operation of the public key infrastructure. In the domain of the authoritative DNS server, decisions are made related to the life cycle of the keys and signatures. In the domain of the user interface and its interaction with the nodes, the operation of the keys is ensured and automated.

BRIEF DESCRIPTION OF THE FIGURES

The accompanying figures represent the preferred embodiments of the present invention with numerical references of the essential elements.

DETAILED DESCRIPTION OF PREFERRED EMBODIMENTS

The present system based on threshold cryptography is a system that provides public key operations in a distributed scheme. However, for the end user it is an invisible system, since the operation remains the same as in the PKI scheme. This distributed system offers interesting features, such as:

Security: the threshold based does not have a secret key. Instead, the secret is protected in a distributed mode, where several pieces of the secret key are stored in different nodes, but none of them has the complete key.

High availability: The threshold cryptography scheme operates with a smaller number of the pieces generated. This implies that it can be kept operational even though some of the nodes of the distributed system are out of service. Note that a node can be removed from operation for several reasons: (i) a hardware failure, (ii) connectivity problems, (iii) attacks by criminals, or (iv) natural disasters.

Figure 1:
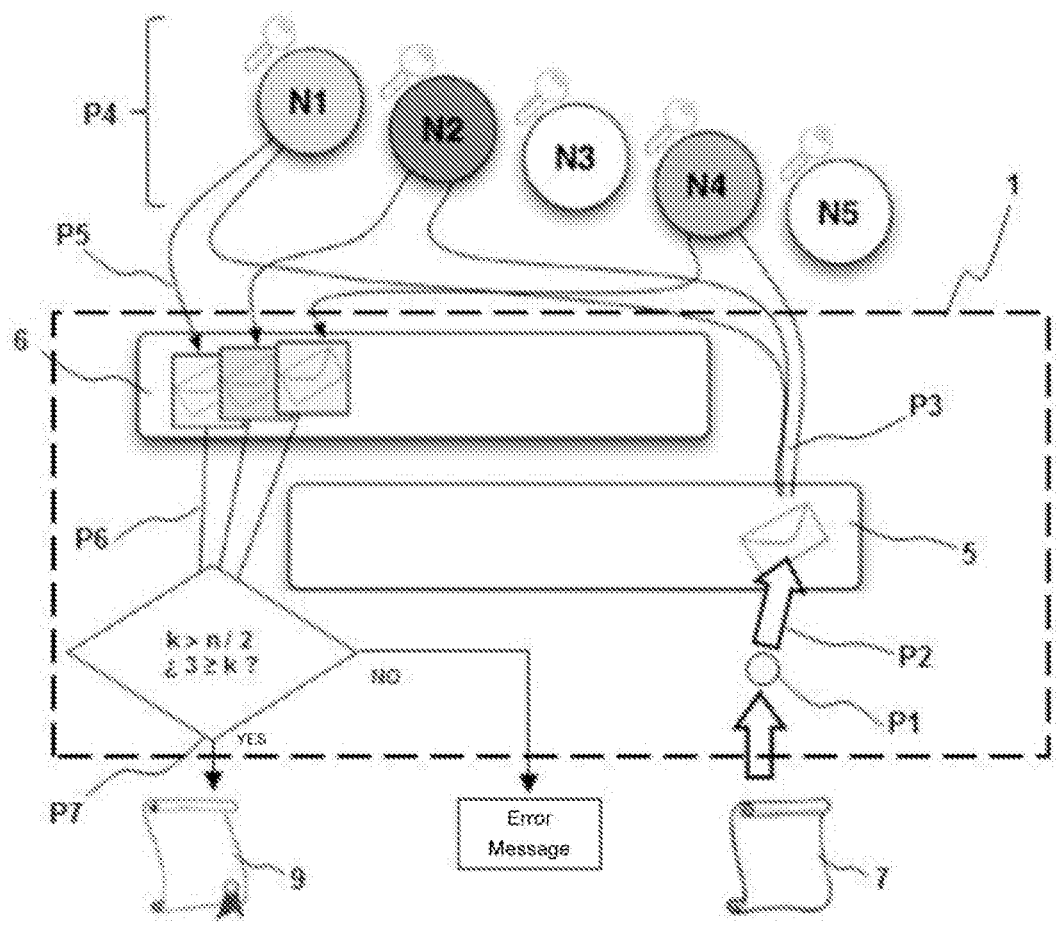
FIG. 1 is a schematic representation of the signature process for an embodiment of the present system.

In FIG. 1, it is depicted a simplified embodiment of the method of operation of the present system, which was referred to before in the general description as the 7 steps of the digital signature process. With respect to FIG. 1, each step is indicated by references P1 to P7, and it is driven by two actors communicating with each other: the signing agent, also referred to as the interface (1), and the nodes (N1 to N5) in total n=5.

In the first step, the signing agent receives together with the document to be signed, an alias, referring to the public key associated with the required signature. In the second step, the signing agent places the document in a queue of requests (5), which is an integral part of the signing agent. In the third step, active nodes get the request from the queue (5); in the example, the active nodes are: N1, N2 and N4, they are the ones that can definitely access (P3) the obtaining of the request that was put in the queue (5) in step 2. The step 4 is also driven by the nodes and its objective is the signature of the document for each node, for that purpose, it is searched in each node, for a previously stored piece of key that corresponds or is valid for the public key indicated by the alias of step 1. With the signature of the document made by a node with its piece of key, its partial signature is obtained. Then in step 5, the nodes N1, N2, N4 put their partial signature in the response queue (6), wherein said queue is part of the interface or signing agent (1). Before generating a complete signature in step 6, the authenticity of each partial signature received with the public key of the sending node is verified, then in step 7, it is attempted to generate the complete signature by combining the received partial signatures. The combination process will lead to a complete signature (9) only if the condition indicated in the decision block associated with step 7 is reached. In the example, the number of verified answers is 3, which satisfies the condition of being greater than or equal to the parameter k of the system, since 3 is greater than the truncated result of 5/2. Then, it is proceed to generate the complete RSA signature (9), which will be delivered to the client application of the system.

The particular reason why the nodes N3 and N5 are inactive is irrelevant. In case there were fewer nodes responding to the request, it would be impossible to generate a complete RSA signature, and the signing agent sends an error message.

The previous example aims, among others, to illustrate that for an external client, the interaction is simply performed with the signing agent, and further, it represents the robustness of the system by not depending on the participation of all nodes, nor the sequence in which they respond, to issue a complete signature.

Figure 5:
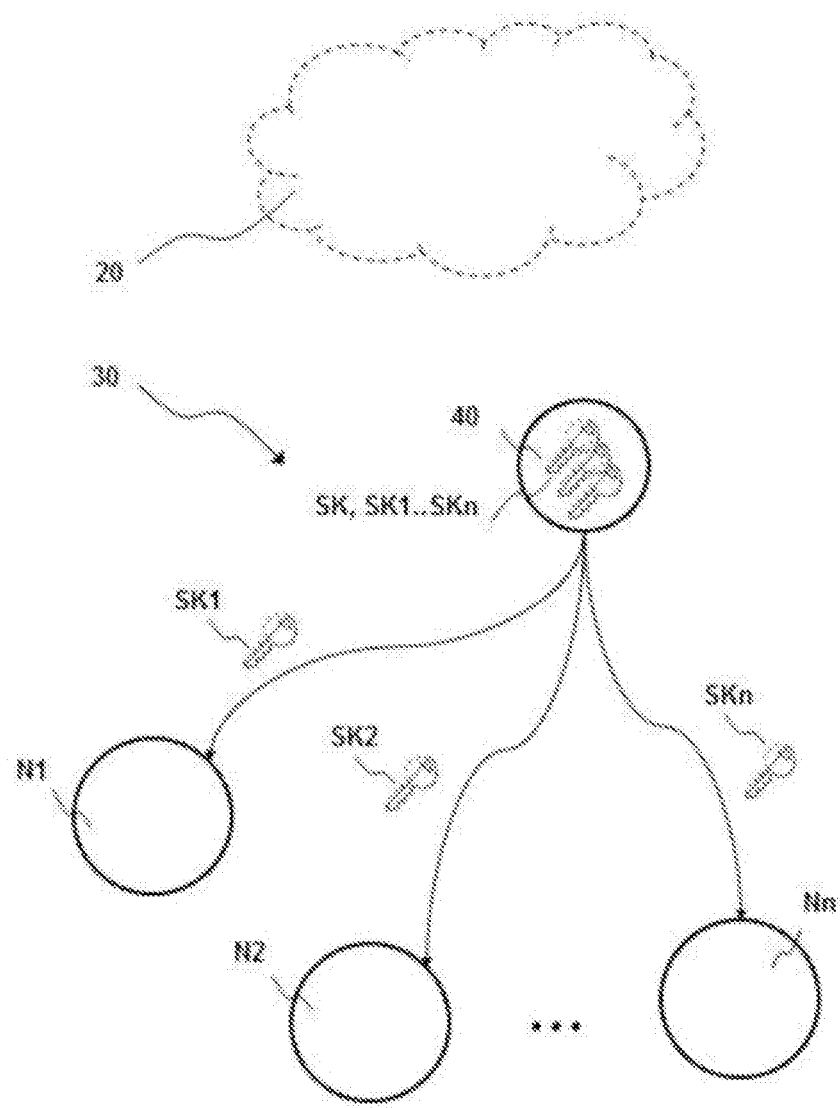
FIG. 5 is a schematic representation of the process of initiation (Prior Art) necessary for the operation of the present system.

The initiation procedure was described before as a step prior to the implementation of the present system, and which is directed to the generation and distribution of the key pieces (SK1, . . . , SKn) between the nodes, which is a known feature in the technical field. Related to it, one can see the scheme of FIG. 5.

It is referred now the architecture of the system for secure electronic communications using security hardware, then it will be referred back to a detailed description of the method of operation. The disclosure will be made with reference to the components illustrated in FIGS. 1, 2A, 2B and 4. Starting by the statement that the basic function that the present system seeks is to sign a document (7) of a user operating a device (10) previous to the sending of said document through a communications network (20).

Figure 2A:
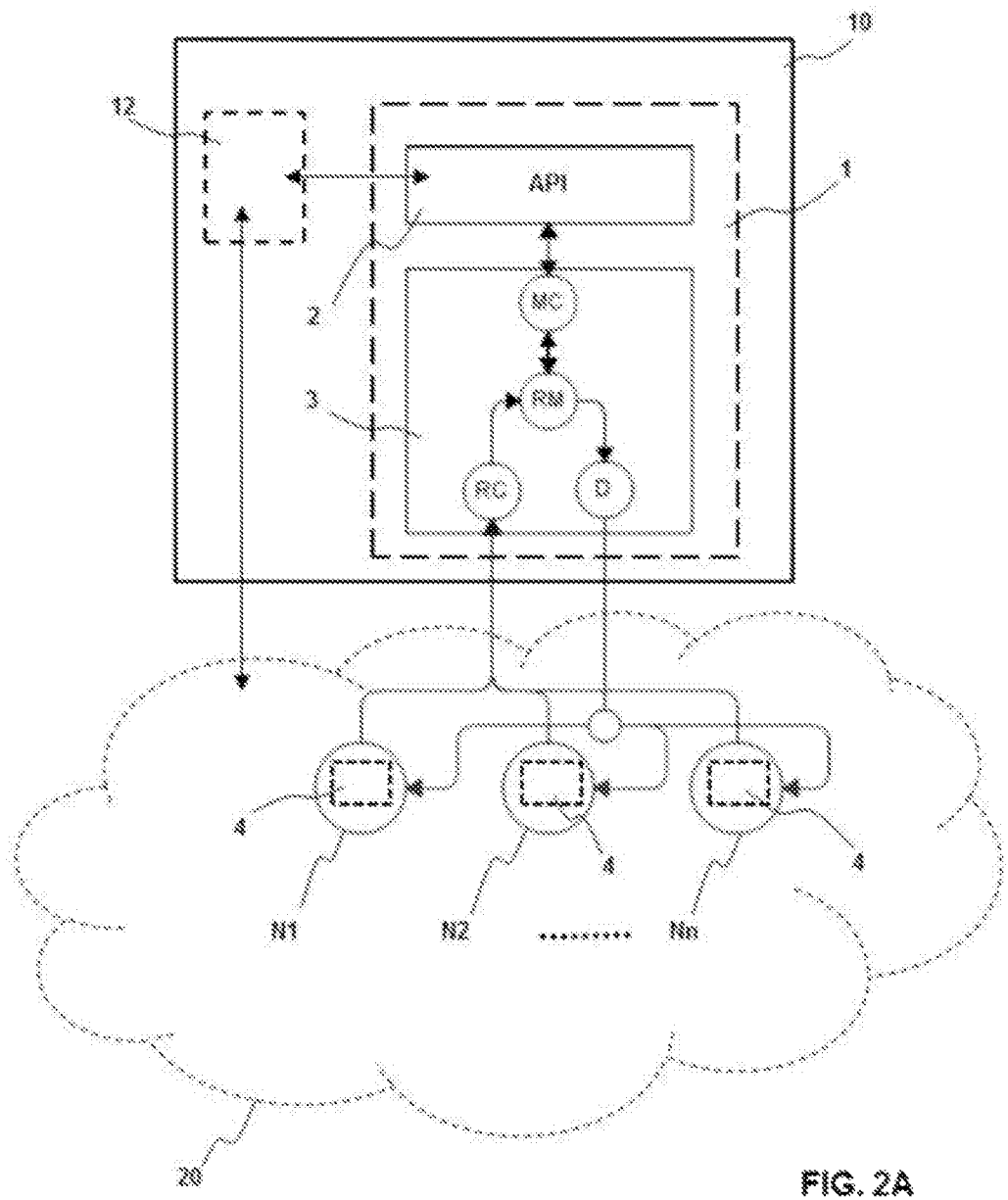
FIG. 2A is a schematic representation of the architecture of the system of the present application.

With reference to FIG. 2A, the architecture of the system consists of two different processes, working in different machines that communicate through messages via TCP, using a asynchronous communication system that provides sending mechanisms by broadcast, for sending messages from the application to the nodes without identifying the specific recipient; and from point to point, for sending messages from the nodes to the application. Examples of these communication systems are ZeroMQ, RabbitMQ, HTTP Rest API, NanoMSG or Raw TCP/IP. With reference to FIG. 2A, the processes that operate are: a) The interface (1) consisting of the API (2) and the Administrator (3), and b) the Node Manager (4). For each instance of the system, there is a unique instance of the interface and a unique set of distributed nodes. Taking into account that several applications that run on the device (10) can send requests to the system.

Although, as it will be seen later, all the messages sent through the communication channels are protected (confidential and authenticated), the system may be adapted by adding a VPN layer for protection. This option allows the location of several nodes in geographically dispersed locations, thus increasing the resistance of the system.

The first process or layer of the system is the interface (1), consisting of files installed on the machine or device (10) that has the application (12) that will be making requests to the system. It includes a dynamic library (2) or API: this part implements the standard API for accessing cryptographic devices in the library file. This library implements the semantics of the HSM operation, so it is transparent for any application (12) that wants to use it. In particular, the library receives the signature function calls to the API (associated with step P1 of FIG. 1), which, then, will enter the administration module (3) where said function calls or requests will be managed. Some examples of the standard of access to cryptographic devices for the implementation of the API are: MS CAPI/CNG belonging to Microsoft®, JCA ("Java Cryptography Architecture") of Sun/Oracle®, and PKCS #11 of the laboratories RSA Labs, the most common of all.

The interface (1) includes a module that acts as administrator (3) of all cryptographic operations. Within its functions of administrator, the interface (1) processes the requests sent by the applications that make use of the system.

If the type of the operation received from the library (2) is a request by a digest function (hash function) or for generation of random numbers, the administrator (3) is responsible for the execution of these operations by itself.

On the other hand, if the type of operation received is to sign a document, the administrator informs (in the form of publication with subscription) to all the nodes that it is necessary to sign that document. Then, the administrator will wait until k of the nodes respond with his partial signature, where k<n, and k is a configurable parameter of the system and n is the number of nodes (k and n are positive integers).

The administrator module (3) is composed of four sub-modules (see FIG. 2A): the Collector Module (MC), the Dispatcher (D), the Results Collector (RC) and the Request Manager (RM). The administrator (3) saves an RSA private key to be used in the authentication mechanism of the messages to the nodes and the RSA public key of each node that is connected in order to authenticate the received messages.

The Collector Module (MC) is the module that receives requests from the library, and that gives the response after the other modules have worked on it. Referring to FIG. 1, the module MC is associated with the step P2.

The Dispatcher (D) is the module that sends messages to the nodes using a broadcast mechanism, for example "Publish" of ZeroMQ. Also, it signs the messages with the private key of the device (10) before sending them. The publication mechanism allows the administrator (3) to transmit a message to the nodes, asking them to generate their partial signature of a single document (7). In addition, it can be used in a unicast mode (point-to-point) to send a message to a particular node; which is useful for, for instance, requesting the deletion of a piece of key associated with a certain public key. Referring to FIG. 1, the dispatcher (D) is associated with step P3.

The Result Collector (RC) is the module that collects the messages from the nodes in order to execute the requested actions. These actions are so called controllers in the system. An example of an action is, the receipt of partial signatures to process them (asynchronously) with the intention of generating the complete RSA signature. This module uses the point-to-point communication mechanism to communicate between the nodes and the client (for example, using "Pull" from ZeroMQ). In addition, this module must provide a system for authenticating the messages exchanged, for example by checking the signature of the messages using the public keys of the nodes. The use of the point-to-point communication mechanism ensures adequate filling of the response queue. In FIG. 1, the results collector (RC) is associated with steps P6 and P7.

For the specific task of verifying partial signatures, this module implements the signature verification algorithm, while the complete RSA signature is obtained through the implementation of a piece combination algorithm; both algorithms are provided by the protocol described by V.Shoup.

The Request Manager (RM) is the module that sends the specific request to the nodes through the Dispatcher, and generates labels ("tickets") to be used in the Asynchronous processing of the answers. The requests that can be sent are: generation of a partial signature and deletion of a piece of key. The labels are stored in the request manager, linked to a specific request.

Note that the request manager (RM) does not know the referenced pieces of key, and can only indicate in each generated label the public key (PK), indicated by the alias (8), which the results collector (RC) must sign with.

In addition, note that the results collector (RC) controllers can operate on each specific request through the use of the label-request association established by the requests manager (RM).

Figure 2B:
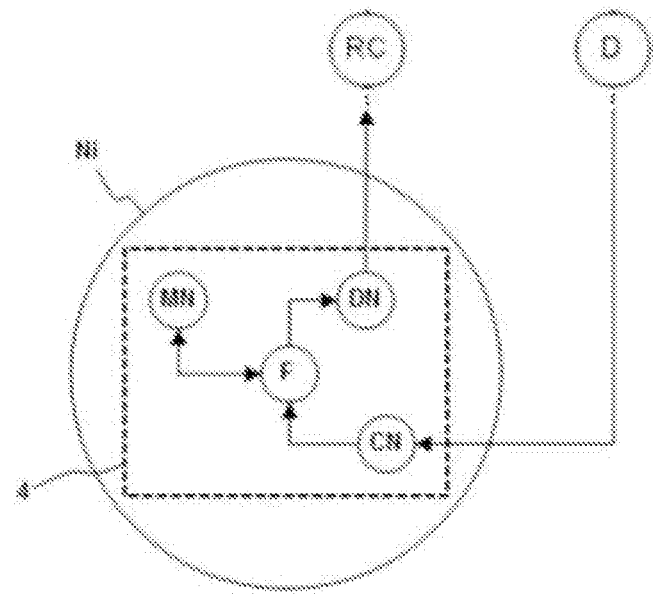
FIG. 2B is a schematic representation of the architecture of the system at level of a node.

We will now refer to the features of the implementation at the level of the Nodes, see also FIG. 2B that represents any node Ni. In each node there is an application or Node Manager (4) (also called "Shareholder Node") which is the process that stores the pieces of key for use in the generation of the partial signature. Two implementations of this client have been developed (in the form of a test): in Java and Python, both carried out following the same modular design:

The Request Collector (CN) is the module that takes note of the requests of the administrator (3) and, as in the Results Collector (RC), it executes actions with these requests. It uses a subscription mechanism to broadcast, which provides the chosen communication system. This mechanism must also provide a system for authenticating received messages. In the case of the ZeroMQ communication system, "Subscribe" is used, which is the corresponding pair of the broadcast transmission mechanism used in the administrator module. The CN module verifies the messages with the public key of the device that hosts the system interface, allowing the secure reception of the node with respect to the origin of the message. The accepted requests are the same as the request manager (RM) can send. Referring to FIG. 1, the Request Collector is associated with step P3 in addition to the Dispatcher (D) in the device (10).

The Node Dispatcher (DN) is the module that sends the responses of the nodes to the requests of the administrator (3) using a mechanism of point-to-point sending of messages to the application ("Push" in the case of ZeroMQ, which is the pair corresponding to "Pull" in the Results Collector module). In addition, this module signs the messages with the private key of the node, allowing secure communication from each node to the user's device (10). Referring to FIG. 1, the Node Dispatcher is associated with step P5.

The Key Pieces manager (MN) is the module that stores the key pieces. The Java implementation uses an H2 database (http://www.h2database.com). The Python implementation uses the "pickle" serialization format (http://docs.python.org/2/library/pickle.html) in plain files. Both (H2 and "pickle") are used for a persistent storage of key pieces.

The Signatory (F) is the module that implements the partial signature generation algorithm. This uses a previously stored piece of key and a document sent by the administrator. Referring to FIG. 1, the signer (F) is associated with step P4 in addition to the dispatcher (D) of the administrator (3).

Note that the exemplary implementations of the Node Manager (4) in two different programming languages are only an indication of the diversity that ensures that each node has individuality, in terms of its hardware and software infrastructure. As we have seen in the case of software, it will refer to the programming language, but also to the established combination in said programming language with the operating system that executes each node.

As mentioned before, the response to the interface library (1) is provided by the Collector Module (MC). Said response will be the complete RSA signature (9), or an error message if the criterion of at least k partial signatures is not met.

Taking into consideration the proposed embodiment, in one mode, the present application refers to a system for secure electronic communication via security hardware, to sign a document (7) of a user operating a device (10) prior to the sending of said document by the user through a communications network (20), the system responds to requests of a client application (12) in the device (10) that makes requests according to a standard of access to cryptographic devices, in which a request from the client application (12) includes a document (7) to be signed and an alias (8) that refers to a public key (PK) among the public keys assigned to the user, so that the signature is verifiable with the public key (PK), which comprises:
  an interface (1), resident in the device (10), to receive the application of the client application (12) and to send the document (7) together with an indication of the action to be carried out based on the alias (8), by means of communication type diffusion through the network (20) to several nodes (N1, . . . , Nn);
  The nodes (N1, . . . , Nn) that are in a total of n, where each node stores one of n pieces of key (SK1, . . . , SKn) according to a threshold signature scheme of k over n, by each public key assigned to the user, and each node comprises:
    a hardware and software infrastructure distinct from the other nodes, incorporating a module that implements a partial signature generation algorithm that uses the document (7), the indication of the action to be performed based on the alias (8), and a piece of stored key,
  wherein the interface (1) is configured to put the request in a queue of requests (5) prior to its communication to the nodes, and to wait until k>n/2 of the n nodes respond with their partial signature to proceed, in the device (10), to generate a complete RSA signature (9), where the response of each node that is active is done by communication point to point towards the device (10), the response of the nodes are received in a queue of responses (6), and the complete RSA signature is generated asynchronously with respect to the order in which the nodes respond.

Additionally, the interface (1), resident in the device (10), comprises: a library (2), which implements an API according to the standard of access to cryptographic devices, to receive each request from the client application (12) and to respond to the client application with the complete RSA generated signature (9) or with an error message, in case of not achieving to receive k partial signatures; and an administrator module (3), in communication with the library (2) for managing the application of the client application (12) with respect to the nodes (N1, . . . , Nn).

Further, the standard of access to devices Cryptography is selected from among the standards: PKCS #11 from RSA Labs, or MS CAPI/CNG from Microsoft® or JCA ("Java Cryptography Architecture") from Sun/Oracle®.

Furthermore, all communications within the system, from or to a node are signed, and for this, each node keeps its own RSA private key and a RSA public key of the device (10), and the administrator (3) saves a RSA private key to be used in the authentication of the messages towards the nodes and the RSA public key of each node that is connected in order to authenticate the messages received.

The maximum grouping of nodes in the same location or physical location is strictly less than k.

Additionally, each group of nodes is under the supervision of a distinct services supplier (Datacenter), thus establishing independence from other nodes.

Alternatively, the nodes have physical mechanisms to prevent access to data; mechanisms that include at least one of: encapsulation in metal casing, use of a common HSM device installed as a peripheral device in each node.

Further, the nodes have physical mechanisms to show evidence of a not allowed access to the data; mechanisms that include at least one of: rivets, labels or evidence seals in case of opening. In the case of labels, the evidence indicating a violation or attempt to is due to the fact that they are made of materials that fracture when an attempt is made to remove the label. Therefore, the label or seal must be located between zones that must be separated or opened to access the media that stores confidential data. The materials to be used are commercially available, for example, from provider as 3M.

From this point, we will delve into a couple of relevant aspects of the present system. In the different implementations of the present system, each node must fulfill the following characteristics:

independence with respect to the other nodes, and
individuality in terms of its hardware and software infrastructure.

As each node keeps a piece of a private key, the independence between nodes it is fundamental, since the failure or violation of one of the nodes should not lead to other nodes being affected. In this sense, not only the physical distribution of the nodes limits access to them, but the distribution of responsibility for their supervision between, for example, different service providers (Datacenters). A maximum grouping of nodes in the same location or physical location of nodes is recommended, with reference to the corrupt nodes in the V.Shoup protocol. Increasing the robustness of the system when the grouping of nodes is smaller, even if one of the locations or service providers (Datacenters) is removed from operation, the operation of the system can continue securely with the active nodes.

Furthermore, individuality is an aspect that provides additional robustness to the system by promoting the diversity of the nodes, in terms of the use of different hardware platforms, operating systems and/or programming languages, which will affect the specific implementation of the Node Manager (4) and of the interface (1), to ensure proper common operation. Similar to the independence item, the individuality criterion recommends that a maximum of nodes can share the same combination of hardware platforms, operating systems and/or programming languages to implement the library.

Note that both aspects, independence and individuality, when combined, they allow to effectively protect the nodes, which, as it has been indicated when responsible of storing the parts or pieces of secret keys, are the elements of the system that are under the greatest threat of attempts to infringe.

Although the qualities of the system exposed herein allow a good level of security without physical mechanisms for prevention of access to data or to evidence the not allowed access to data, these mechanisms can be included, in an alternative embodiment, as an integral part of the means that have the nodes (or at least one of them) to store, protect and use each piece of a private key.

Figure 3:
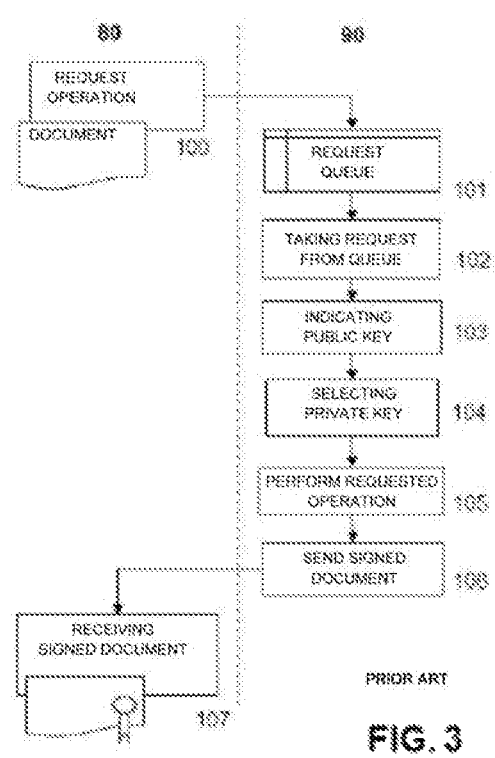
FIG. 3 is a block diagram of the operation of a common HSM (Prior Art).
Figure 4:
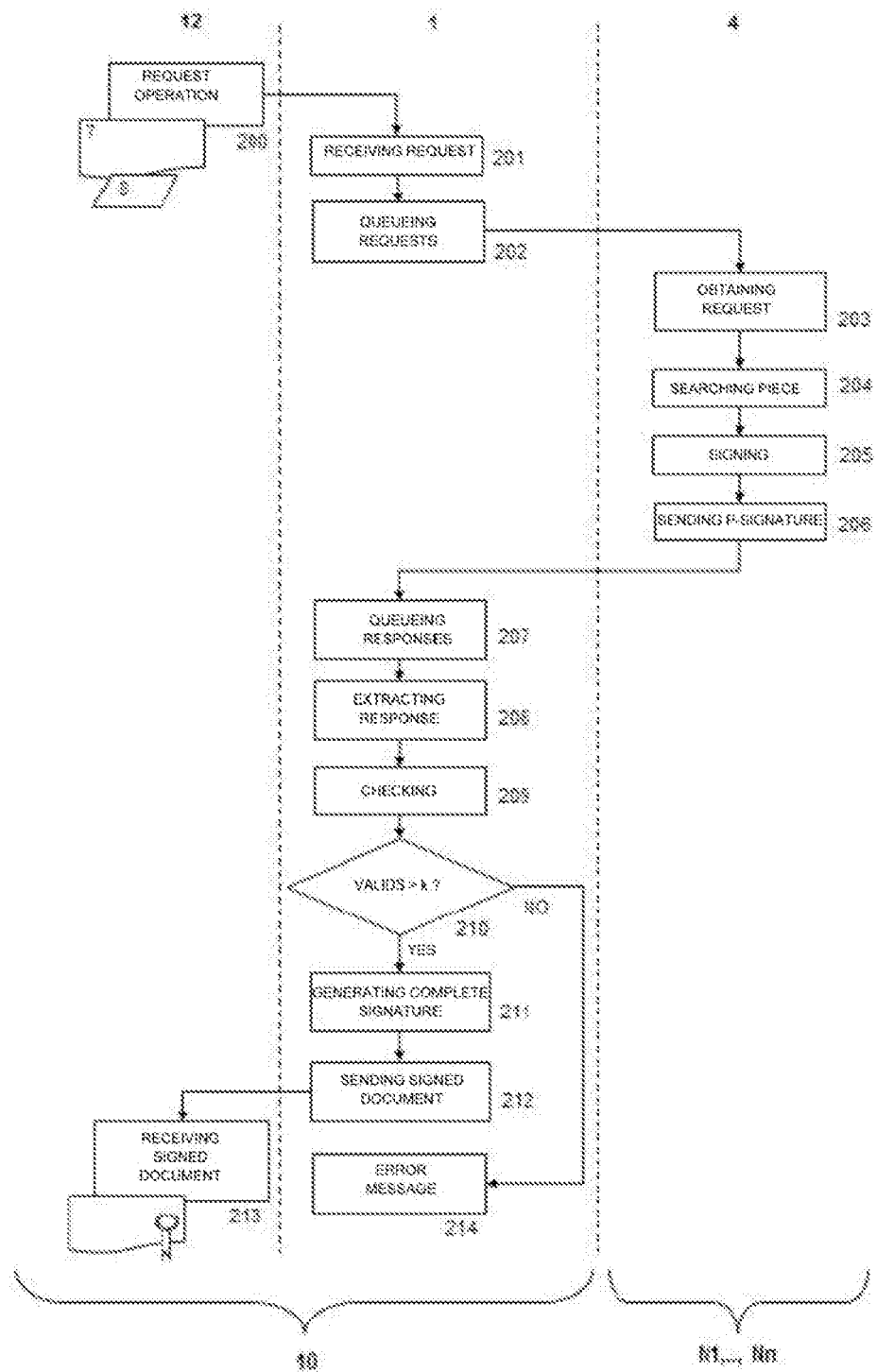
FIG. 4 is a block diagram of the operation of the present system.

In order to compare the operation of a common HSM versus the present system, it is shown the block diagram of FIG. 3 (State of the Art) and the block diagram in FIG. 4, respectively.

A common HSM, according to FIG. 3, operates in coordination with software programmed based on a standard API used by the applications to communicate with an HSM, independently of whoever is the hardware manufacturer. The common HSM is connected to the user's device, such as a peripheral card connected to a PCIe port. The operation is such that the processes in column 80 of the block diagram (FIG. 3) are performed by an application on the device of the user requesting (100) the performing of a cryptographic operation applied to a document or message. Whereas, the processes in column 90 are performed by the common HSM, and include: the incorporation (101) of the request to the queue of requests, the taking or obtaining (102) of a request from the queue of requests, the identification (103) of the public key, the selection or obtaining (104) of a private key that is stored in the common HSM and that is the pair of the identified public key, the proceeding to perform (105) the requested cryptographic operation using the private key obtained before, and the sending (106) of the signed document. Finally, the application 80 on the user's device receives (107) the document or message processed by the common HSM ready to be sent through the communications network.

Referring to the FIG. 4, it is shown a diagram of the operation of this system, there is three columns: column 12 refers to the processes performed by an application (12) resident on the user's device that requests (200) to perform a cryptographic operation applied to a document or message (7), column 1 represents the processes which performs the interface (1) resident in the users device (10), and column 4 represents the processes performed by each specific implementation of the Node Manager (4) resident in each of the nodes, arranged to serve the device (10) as an integral part of the present system. Also in the lower part of FIG. 4, the columns are grouped according to the machine in which the process is carried out; thus columns 12 and 1 are grouped by the numerical reference of the device (10), while column 4 is referred to the nodes (N1, . . . , Nn).

With the above-mentioned diagrams, it is noticeable the differences of the proposed system with respect to the state of art. In particular, showing that the use of n nodes communicated with interface (1) operates while the application (12) in the device (10) cannot distinguish it from a common HSM.

The method of operation of the system for secure electronic communications based on security hardware will be described below. Note also the block diagram of FIG. 4 showing the subdivisions of some steps in the Signature process illustrated in FIG. 1.

In accordance with the disclosed system, the basic function of the present method is to sign a document of a user operating a device (10) prior to sending said document through a communications network (20), the method operates starting from a request from a client application in the device (10) that makes requests according to a cryptographic devices access standard, in which a request from the client application (12) includes a document (7) to sign and an alias (8) that refers to a public key (PK) among the public keys assigned to the user, such as the signature is verifiable with the public key (PK), in which the method comprises the steps of:

a) receiving, at an interface (1) resident on the device (10), the request of the client application (12) with the document (7) and the alias (8);

b) placing the document (7)) in a queue of requests (5), through the interface (1);

c) taking the document (7) from the queue of requests (5), through the interface (1), and sending it together with an indication of the action to be performed by means of a broadcast communication through the network (20) to several nodes (N1, . . . , Nn), in total n, in which the action to be carried out is the generation of a partial signature of said document (7) with any one of a several pieces of key (SK1, . . . , SKn) associated with the public key (PK) referred by the alias (8), according to a threshold signature scheme of k over n;

d) receiving, for each active node, the document (7) together with the indication to sign;

e) signing, for each active node, the document (7) with a piece of key stored in the chosen node according to the indication, to generate a partial signature;

f) sending, for each active node, a response with its partial signature by means of point-to-point communication towards a response queue (6) in the device (10), through the network (20);

g) receiving, through the interface (1), the responses and verify their authenticity with the public key of the node that sent it, h) generating, by the interface (1), a complete RSA signature (9) asynchronously with respect to the order in which the nodes respond, when k>n/2 partial signatures are received, or generating an error message in case of receiving less than k partial signatures;

i) delivering, through the interface (1), the complete RSA signature (9) to the client application (12) according to the cryptographic devices access standard, so that the client application receives said complete RSA signature as if it were delivered by a common and unitary hardware security module (HSM).

Application Examples

In a particular example, it is possible to implement the nodes on typical desktop computers.

In another more economic implementation of the present invention, and with lesser performances, the nodes can be implemented based on ARM systems. For instance, using "Raspberry pi B" machines, which are ARM of a Broadcom BCM2835 core at 700 MHz, 128 KB of memory cache and 512 MB of RAM. All devices being connected to a local Gigabit network, with a latency of less than 1 second.

Thus, it is notable that the present system does not require high-performance equipment and cost, for the nodes.

The parts or pieces of keys are generated in accordance to the scheme described by Victor Shoup. Distributing the pieces of keys between n=8 nodes, the signature will be validated when the first k=5 nodes, active or not committed by security failures, delivering its corresponding piece of key. Another example of smaller system size could be with n=6 and k=4.

As the system was designed to allow the implementation of the nodes in different programming languages, and the operation of them in different operating systems and architectures. In one embodiment, the nodes can use combinations of languages and operating systems such as: Java/Linux, Java/Free BSD, Phyton/Linux among others.

Advantages

The present system operationally, simulating a common HSM, advantageously can tolerate a defined amount of violations that affect different nodes, without affecting the reliability of the signed messages. Granting flexibility and responsiveness when facing the attempts to breach its security.

The proposed solution is designed to be extremely easy to adopt, since it provides a simple but standard interface for any application that wants to use it: from the outside, the system presents the standard interface for accessing cryptographic devices for the implementation of the associated API. This provides a transparent interface between applications and this system: any application that already has access to an HSM is able to use this solution almost unchanged.

It is to be noted that the presented solution can be implemented without the need of special hardware (which leads to minors costs), it is resistant to attacks such as those presented in the work of Bau and Mitchell (J. Bau and JC Mitchell. "A security evaluation of dnssec with nsec3", in NDSS "The Internet Society", 2010, and it provides a high availability rate, since several nodes can fail and the system will still work anyway. While the hardware security modules, thou they provide a very high average time between failures, even in the worst scenario, they can fail or be affected by natural disasters.

With respect to the DNSSEC, the two most used mechanisms: Bind and OpenDNSSEC, use a one-to-one client-server scheme to handle signatures and keys, both provide the connection to the hardware security modules (HSM) through PKCS#11 connections. However, the main point of the present system is the reliability of the system based on threshold cryptography in comparison with the typical client-server systems.

In general, with respect to those systems that use a central device managing the private keys, located between several Nodes and users, through different methodologies of key management, it is appreciated that the present system is more resilient and tolerant to failures, although, not necessarily more secure, if not equally secure. Further, in the present system it is easier to start the service.

In order to summarize the advantages of the present system and compare them with the current offer in the safe handling of keys, the present invention and five other systems have been individualized for comparison in tables 1A and 1B, followed by a quantitative comparison in table 2. The properties compared in the metric include qualitative and quantitative properties, in each case, values between 0 and 5 have been assigned to represent different levels between the null property value and the maximum property value.

TABLE 1

| | Present system | SoftHSM | CloudHSM |
|---|---|---|---|
| Interface | Ethernet | Software | Ethernet |
| Type | Software | Software | Software + Hardware |
| Certification | No | No | FIPS 140-2 L3 |
| Performance (signature/s) | ~85 | ~1500 | ~1700 |
| Price (USD) | $30.00/Node | $0.00 | $1373/Month |
| Provider | | OpenDNSSEC | AMAZON |
| Security key storage security model | Security based on the geographical distribution of several pieces of secret keys. To be able to do damage you have to attack multiple data centers at the same time. | Not existing | Externalization of the service. To be able to do damage, a data center must be attacked. |
| Authentication | The system requires authentication using public key cryptography with elliptical curves. | The system can use role authentication (administrator and user) with 4-digit keys. | The system requires authentication using public key cryptography. |

The indicated datacenter are not included in the price of each system.

| | SCA 6000 | AEP Keyper 9720 | IBM 4764 PCIXCC |
|---|---|---|---|
| Interface | PCI-Express | Ethernet | PCI-Express |
| Type | Hardware | Hardware | Hardware |
| Certification | FIPS 140-2 L3 | FIPS 140-2 L4 | FIPS 140-2 L4 |
| Performance (signatures/s) | ~13000 | ~1200 | ~1200 |
| Price (USD) | $1.000,00 | $18.600,00 | $7.000,00 |
| Provider | SUN (ORACLE) | AEP | IBM |
| Security model for the storage of secret keys | Physical Security. To do damage you have to attack a datacenter | Physical Security. To do damage you have to attack a datacenter | Physical Security. To do damage you have to attack a datacenter |
| Authentication | Full Authentication | Full Authentication | Full Authentication |

In the price item of table 1A, the estimated cost of a Raspberry machine is considered according to one of the application examples, the cost of the system is determined by the number of nodes to be used.

TABLE 2

Comparative metric

| | Present system | SoftHSM | CloudHSM | SCA 6000 | AEP Keyper 9720 | IBM 4764 PCIXCC |
|---|---|---|---|---|---|---|
| Price | 5 | 5 | 2 | 2 | 1 | 2 |
| Generic properties: | | | | | | |
| Scalability | 5 | 0 | 5 | 3 | 3 | 3 |
| Performance | 1 | 3 | 3 | 5 | 3 | 3 |
| Redundancy | 4 | 0 | 5 | 3 | 3 | 3 |
| Facility of Backup | 5 | 5 | 3 | 3 | 3 | 3 |
| Infrastructure | 4 | 2 | 4 | 5 | 5 | 5 |
| Average Generic p. | 3.8 | 2 | 4 | 3.8 | 3.4 | 3.4 |
| Specific advantages: | | | | | | |
| Physical Security | 5 | 0 | 5 | 4 | 5 | 5 |
| Authentication | 5 | 3 | 5 | 5 | 5 | 5 |
| When having a machine disabled, does not give access to secrets | 5 | 0 | 3 | 3 | 5 | 5 |
| Evidence of violation | 3 | 0 | 3 | 3 | 5 | 5 |
| When a machine is disabled, the system continues to operate | 5 | 0 | 3 | 0 | 0 | 0 |
| Network failure tolerance | 4 | 5 | 3 | 5 | 3 | 5 |
| Average advantages esp. | 4.5 | 1.3 | 3.7 | 3.3 | 3.8 | 4.2 |

For the revision of the previous metric it should be considered that, thou it is not the same to need a secure mechanism that provides 17000 signatures per second, than to need a cheap solution that provides better security but with lower performance, anyway it is considered important to propose a comparison. As the evaluation of which alternative should be used corresponds to the client, to generate a metric it is reasonable to believe that there is a weighting between the different evaluations, which would lead to different results depending on what the client seeks to represent with such weighting. For example, a user that values the price more, physical security, and is willing to have a lower performance (in terms of the signatures per second) will notice a clear advantage of the present system over all alternatives; even more considering that the observed performance of 85 signatures per second is sufficient for the current needs of a wide range of users.

Below we refer to the properties presented in table 2. In order to allow an independent assessment of different aspects, different properties were grouped to form three groups: price, generic properties, and specific advantages.

The generic properties are commonly observed in computer systems and include: scalability, performance, redundancy, ease of backup and infrastructure. The property "Infrastructure" refers to the simplicity of the infrastructure involved, so, in the systems that need a network infrastructure there is a penalty with respect to the systems that are devices coupled to a user device.

In the specific properties or advantages, in terms of devices of the HSM type, it includes: "physical security", "authentication", "Having a disabled machine does not give access to secrets", "evidence of violation", "Having a disabled machine keeps the system running" and "tolerance to network failure".

The advantage "Having a machine disabled does not give access to secrets" refers to a person who violates a machine (a node, the device with a common HSM or the Director's device in CloudHSM, etc), physically disabling it or due to memory theft, but is still difficult or impossible to obtain access to the secret data in its entirety, so that he can have, for instance, a not authorized use of them. For this advantage, we note that between the present system and the one of IBM, the maximum scores are reached. An explanation of the above is because in a system like the IBM, if they steal the user's computer, they can use their private keys, as long as they also have the access PIN. In the present system, in case the machine is the user device, the security can also be solved if the user uses some external device for the storage of the access PIN, for example using a access USB storage device (pendrive). But in the case that the stolen machine is any node, it will never provide access beyond the stored piece of key, which in the present system does not allow to generate a complete signature.

The property of "evidence of violation" has high values when it is easy for a person in charge or for the user of the system to detect that a machine was disabled because it was physically affected or because its memory was stolen. For the present invention the value of this property can be easily increased by incorporating in each node means of evidence of violation, known in the art, with a corresponding increase in the costs of the system.

The property or advantage "Having a machine disabled the system continues to operate" implies a safe operation. It may be noted that if the physical HSM devices of higher price are disabled, the system simply could not work, and in the case of memory theft, the only possible measure is the revocation of the affected keys. In contrast, the present system can resist the disabling of several nodes, or even of the user's device or computer. In the case of theft, as mentioned above, if the user uses an external device for the storage of the access PIN, the system can be quickly replaced, since the keys are stored in the nodes, therefore they can be request them and the system works again as before.

The invention claimed is:

1. A system for secure electronic communications using security hardware, to sign a document of a user operating a device prior to the sending of said document by the user through a communications network, the system responds to requests from a client application in the device that makes requests according to a cryptographic devices access standard, in which a request from the client application includes a document to be signed and an alias that refers to a public key among the public keys assigned to the user, so that the signature is verifiable with the public key, comprising:
   an interface, resident in the device, to receive the request of the client application and to send the document together with an indication of the action to be performed based on the alias, by means of broadcast communication through of the network to several nodes;
   the nodes, which are in total n, where each node stores one of n pieces of key according to a threshold signature scheme of k over n, for each public key assigned to the user, and each node comprises:
      an infrastructure of hardware and software distinct from the other nodes, incorporating a module that implements a partial signature generation algorithm that uses the document, the indication of the action to be performed based on the alias, and a stored piece of key,
   wherein the interface is configured to put the request in a queue of requests prior to its communication to the nodes, and to wait until $k > n/2$ of the n nodes respond with its partial signature to proceed, in the device, to generate a complete RSA signature, in which the response of each node that is active is made by point-to-point communication towards the device, the response of the nodes is they receive in a reply queue, and the complete RSA signature is generated asynchronously with respect to the order in which the nodes respond.

2. The system according to claim 1, wherein the interface, resident in the device, comprises:
   a library which implements an API according to the cryptographic devices access standard, to receive each request of the client application and to respond to the client application with the complete RSA signature generated or with an error message, in case of not reaching the receiving of k partial signatures; and an administrator module, in communication with the library, to manage the application of the client application with respect to the nodes.

3. The system according to claim 2, wherein the cryptographic devices access standard is selected from among the standards: PKCS#11 of RSA Labs, MS CAPI/CNG of Microsoft®, or JCA ("Java Cryptography Architecture") of Sun/Oracle®.

4. The system according to claim 3, wherein all communications to the interior of the system, from or to a node are signed, and for this each node keeps its own private key RSA and a public key RSA device, and the administrator save an RSA private key to be used in the authentication of the messages to the nodes and the RSA public key of each node that is connected in order to authenticate the received messages.

5. The system according to claim 1, wherein the maximum grouping of nodes in the same location or physical location is strictly less than k.

6. The system according to claim, wherein each grouping of nodes is under the supervision of a different service provider (Datacenter), thus establishing the independence with respect to the other nodes.

7. The system according to claim 1, because nodes have physical mechanisms to prevent access to data.

8. The system according to claim 7, wherein the physical mechanisms of prevention of access to data include at least one of: encapsulation in metal housing, use of a common HSM device installed as a peripheral device in each node.

9. The system according to claim 1, wherein the nodes have physical mechanisms to evidence the access not allowed to the data.

10. The system according to claim 9, wherein the physical mechanisms to evidence the access not allowed to the data include at least one of: rivets, labels or evidence seals in case of opening.

11. A method of operating a system for secure electronic communications using security hardware, to sign a document of a user operating a device prior to sending said document through a communications network, the method operates from a request of a client application in the device that makes requests according to a cryptographic devices access standard, in which a request of the client application includes a document to be signed and a alias that refers to a public key among the public keys assigned to the user, so that the signature is verifiable with the public key, comprising the steps of:
- a) receiving, in an interface resident in the device, the application of the client application with the document and the alias;
- b) placing the document in a queue of requests, through the interface;
- c) taking the document from the request queue, through the interface, and sending it together with an indication of the action to be performed by means of broadcast type communication through the network to several nodes, in total n, in which the action to be carried out is the generation of a partial signature of said document with any one of a few pieces of key associated with the public key referred by the alias, according to a threshold signature scheme of k over n;
- d) receiving, for each active node, the document together with the indication to sign;
- e) signing, for each active node, the document with a stored piece of key in the node chosen according to the indication, for the generation of a partial signature,
- sending, for each active node, a response with its partial signature by means of a point-to-point communication towards a response queue in the device, through the network
- g) receiving, through the interface, the responses and verifying their authenticity with the public key of the node that sent it,
- h) generating, through the interface, a complete RSA signature asynchronously with respect to the order in which the nodes respond, when k>n/2 partial signatures are received, or generating an error message in case of receiving less than k partial signatures; through the interface, the complete RSA signature to the client application according to the cryptographic devices access standard, so that the client application receives said complete RSA signature as if delivered by a module Security type (HSM) common and unitary.

12. The method according to claim 11, wherein the cryptographic devices access standard is selected from among the standards: PKCS#11 of RSA Labs, MS CAPI/CNG of Microsoft®, or JCA ("Java Cryptography Architecture") of Sun/Oracle®.

* * * * *